United States Patent

[11] 3,599,147

[72] Inventors Gordon Leonard Rogers;
Ian Leifer; Noel W. F. Stephens, all of
Gosta Green, Birmingham, England
[21] Appl. No. 758,969
[22] Filed Sept. 11, 1968
[45] Patented Aug. 10, 1971
[73] Assignee National Research Development Corporation
[32] Priority Sept. 12, 1967, Mar. 26, 1968
[33] Great Britain
[31] 41,641/67 and 14,443/68

[54] CHARACTER RECOGNITION SYSTEMS AND APPARATUS
31 Claims, 17 Drawing Figs.

[52] U.S. Cl. .................... 340/146.3, 356/71, 350/162
[51] Int. Cl. .................... G06k 9/08
[50] Field of Search .................... 340/146.3, 146.3 P; 356/71; 350/3.5, 162

[56] References Cited
UNITED STATES PATENTS

| | | | |
|---|---|---|---|
| 3,064,519 | 11/1962 | Shelton, Jr. | 340/146.3 |
| 3,305,834 | 2/1967 | Cooper et al. | 340/146.3 |
| 3,435,244 | 3/1969 | Burckhardt et al. | 340/146.3 |

OTHER REFERENCES

" Character Recognition By Incoherent Spatial Filtering," by Armitage and Lohman, published in Applied Optics for April 1965, Vol. 4, No. 4, including pages 461— 467

*Primary Examiner*—Thomas A Robinson
*Attorney*—Cushman, Darby & Cushman

ABSTRACT: Method of and apparatus for effecting recognition of patterns, especially written or printed characters in which a representation of the pattern in incoherent light, moving electrons or other charged particles is caused to cast shadows of a grating on to a plurality of photoelectric or equivalent sensing devices thereby to derive a number of electric signals representing respectively different Fourier coefficients of one or more spatial frequency components of the pattern and in which such derived signals are comparatively examined in logical circuit means to derive an output signal identifying the pattern.

CHARACTER RECOGNITION SYSTEMS AND APPARATUS

This invention relates to methods of and apparatus for effecting recognition of patterns, especially printed or written characters, and is more particularly concerned with systems which employ optical transformation methods.

Various optical transformation methods have already been proposed for effecting character recognition. In most cases operation with coherent light is essential while it is usually necessary for the character under examination to be in the form of a transparency of good optical quality, preferably one in which the character is transparent in an opaque background. Such requirements are disadvantageous in any practical application to the reading of normal printed or written text, for instance, to the reading of typed or printed matter or the normal paper tape output of calculating or other business machines.

Objects of the invention include the provision of an improved method or system and apparatus for carrying out such method, in which coherent light is not needed and in which the pattern, e.g. character, under examination need not be in the form of a transparency.

The method of effecting recognition of a pattern according to the invention comprises the steps of causing a representation of the pattern in incoherent light, moving electrons or other charged particles to cast shadows of at least one grating of straight opaque lines and transparent interline spaces on to a plurality of appropriately positioned photoelectric or equivalent sensing devices thereby to derive a plurality of electric signals representing respectively different Fourier coefficients of one or more spatial frequency components of the pattern said plurality including a signal representing the phase of at least one of said Fourier coefficient, and then subjecting said plurality of signals to a comparative examination by means of a logical circuit network to derive an output signal indicative of the identity of the represented pattern.

In apparatus according to the invention there is provided means for forming a representation of said pattern in incoherent light, moving electrons or other charged particles, a grating of straight opaque lines and transparent interline spaces, means for directing said pattern representation on to one side of said grating, a plurality of photoelectric or equivalent sensing devices located relative to said grating at positions to receive light, electrons or other charged particles from said representation passing through said interline spaces of said grating, said positions being so chosen that the signal outputs from said sensing devices represent respectively different Fourier coefficients of one or more spatial frequency components of the pattern means for deriving a signal output representing the phase of at least one of said Fourier coefficients, and a logical circuit network connected to be supplied with said outputs from said sensing devices and said output from said means for deriving a phase representative signal and adapted by comparative examination of said outputs to provide an output signal indicating the identity of said represented pattern.

With such a method or apparatus arrangement the light or equivalent charged particle representation of the pattern or character will normally throw a blurred shadow of the grating on a screen located in a plane such as that of one or more of the sensing devices but if some spatial frequency component of the pattern happens to interact with the particular interline spacing dimension of the grating and the grating-to-screen distance a sharp shadow image may result with consequent enhanced output from said sensing means. If, as is usually to be preferred, relative scanning movement is caused to take place between the pattern representation and the grating and/or the sensing devices, then a fluctuating or AC output signal is provided by each sensing device with peak amplitudes at different instants during each scanning cycle.

A number of gratings and sensing devices may be provided with suitable grating and/or grating-to-sensing device spacings to provide signals related respectively to a number of different spatial frequencies and these may be chosen to run in a variety of different directions determined by the orientation of the grating lines relative to the pattern representation.

A circular scanning movement is a convenient one to produce. When light is used, this may be achieved by mechanical means such as a rotating mirror or prism but other movement path patterns may be employed. Instead of mechanical scanning means it is, however, preferable to employ electron-optical devices such as image converter tubes or image intensifier tubes in order to allow increase of speed of the scanning cycle and hence of the rate of recognition.

The above and other features of the invention will be more readily apparent from the following description of a number of embodiments thereof as applied to the recognition of printed numerals within the decimal range of 0—9 and given by way of illustrative example only with reference to the accompanying drawings in which:

FIG. 16 is a block schematic diagram of an alternative arrangement for generating a phase reference signal, while

Figure 1:
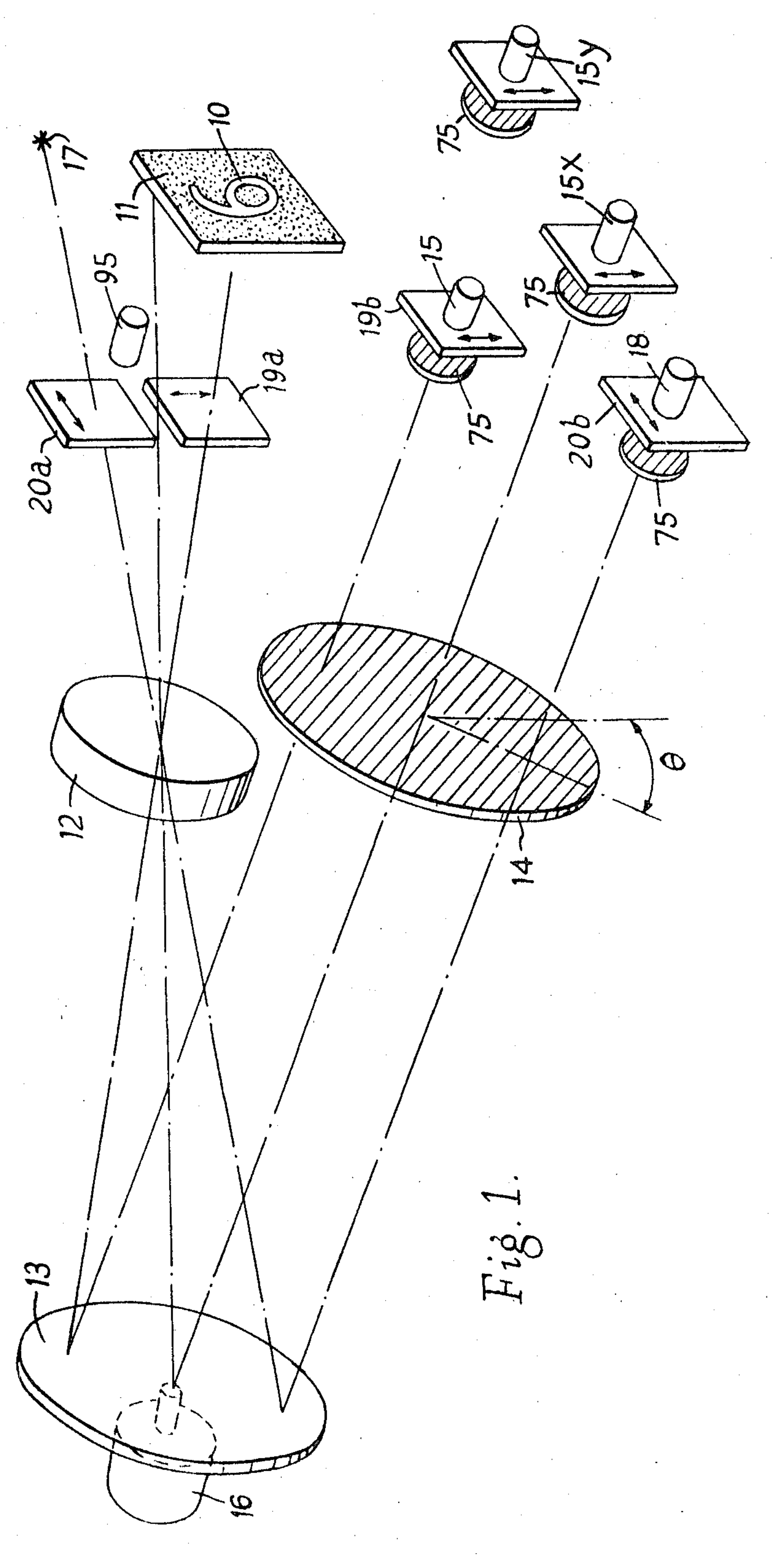
FIG. 1 is a diagrammatic perspective view of one simple apparatus arrangement constructed and operating in accordance with the invention.

Referring first to FIG. 1, which shows the essential components of one simple arrangement according to the invention using incoherent light and in which a real image 10 of a character-forming pattern to be recognized, e.g. a numeral from within the decimal range 0—9, is produced on a light diffusing screen 11 or the like. A stationary lens system 12 then produces a virtual image of the character at infinity by being so placed that its focal plane corresponds to the plane of the screen 11. The character-representing beam of incoherent light emerging from such lens system 12 is reflected by a preferably circular plane mirror 13 on to one side of a grating 14 of chosen opaque line and transparent interline spacing dimension and through which some of the light beam passes to fall on to a first photodetector 15.

The mirror 13 is mounted upon the shaft of a suitable, e.g. electric, motor 16 and is set so that the shaft axis is at a slight angle of a few degrees from perpendicular to the mirror plane whereby the character image is rotated around a circular scanning path over the grating 14 and an element of variation or flutter is introduced into the virtual image of the character seen in the mirror.

Figure 2:
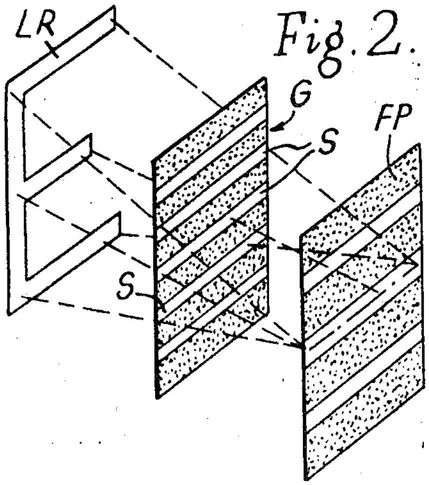
FIG. 2 is a perspective view and FIG. 3 is a diagrammatic vertical sectional view of the elements shown in FIG. 2 illustrating, in simplified manner, the basic principle of shadow formation at critical spacing distance between the pattern representation, the grating and the Fourier transform plane.
Figure 3:
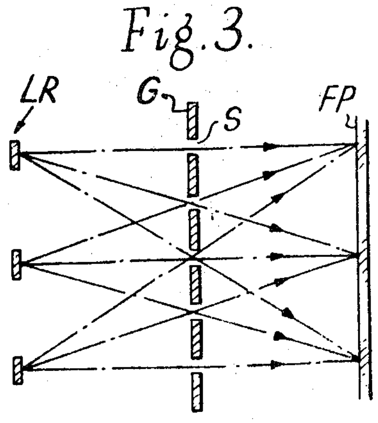

Referring now to FIGS. 2 and 3, these illustrate the manner in which a sharp shadow of a grating G is produced in a plane FP located at a critical distance from the grating and arising from the interaction of light from each of the horizontal limbs of the incoherent light representation LR of the letter E passing through the similarly horizontal transparent interline spaces S of the grating. For given distances between the input light representation LR and the grating G and between the grating G and the plane FP, the shadow cast will be sharp if there exists a corresponding spatial frequency in the object of representation. As will be self-evident from FIGS. 2 and 3, the frequencies concerned can be varied by varying the shadowing distance or by altering the interspace dimension of the grating while the orientation of the components under investigation can be varied by altering the angle of the grating.

Referring again to FIG. 1, the detector 15 is located in that plane, lying on the opposite side of the grating 14 to the arriving light beam, which gives the maximum contrast in the shadow for the spatial frequency chosen for examination while the grating 14 is made rotatably adjustable within its own plane to allow setting of the angle $\theta$ of the grating lines in any desired orientation relative to the character image.

The output of the detector 15 during each rotation or scanning cycle of the mirror 13 is a varying temporal frequency signal representative of a particular spatial frequency component of the Fourier transform of the character as determined by the grating line spacing dimension and the grating-to-detector spacing distance. As already explained with reference to FIGS. 2 and 3, the operative spatial frequency may be altered by using a grating of different line spacing dimension and/or altering the grating-to-detector distance. As will be explained hereinafter a plurality of different spatial frequency signals are needed to identify any one character within a range of characters. Such plurality of signals may be obtained by providing a number of separate photodetectors 15 at different spacing distances from the grating 14 as shown at 15*x* and 15*y* in FIG. 1.

To provide a phase reference signal, a point or other small size light source 17 is positioned in the focal plane of the lens system 12 to direct a further beam of noncoherent light through the lens system 12 on to the rotating mirror 13 and thence through the grating 14 to a second photodetector 18 located in the same plane as the detector 15. The output from this detector 18, due to the imposed circular scanning movement, is a varying amplitude signal representative of the scanning cycle. The character and reference beams must be kept separate from one another and to ensure this they may be cross-polarized by the interposition of suitable filters 19*a*, 19*b* and 20*a*, 20*b* having respective polarization directions as indicated by the arrows therein.

An alternative method of keeping the two signals separate is to use suitable color filters. Thus the filters 19*a* and 19*b* may be Ilford Mercury yellow filter No. 808. These will pass wavelengths from 5800 A. into the infrared region to which most photodetectors are particularly sensitive. The filters 20*a* and 20*b* could then be Ilford mercury Green filter No. 807 together with a heat absorbing glass. The small light source 17 would then be a stabilized mercury arc.

Figure 4:
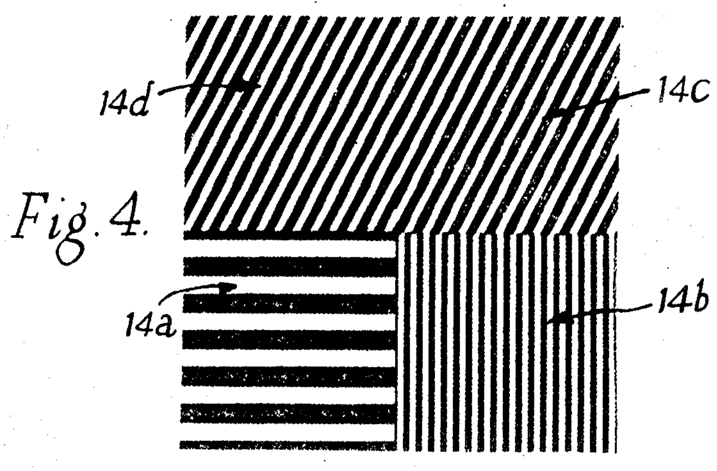
FIG. 4 illustrates, in elevation, one alternative form of grating simplified for practical use in an arrangement as shown in FIG. 1.

The simple grating 14 shown in FIG. 1 necessitates rotation of the grating bodily in order to investigate different angles $\theta$ and the disposition of the photodetector devices at different distances from the grating in order to investigate different spatial frequencies. An alternative is to use a composite grating containing a number of separate regions with the respective stripes thereof having different spacing dimensions and being set at different angles. One, simple, grating of this form is shown in FIG. 4 where four sections 14*a*, 14*b*, 14*c*, 14*d* are provided, the sections 14*a*, 14*c* and 14*b* being of progressively smaller interline spacing dimension and being set, one (14*a*) with such spaces horizontal, another (14*b*) with its spaces vertical and the third (14*c*) with its spaces inclined at an angle. The fourth section, 14*d*, which is a continuation of the third section, 14*c*, is the one employed with the crossed polarized reference beam, FIG. 1, to provide phase information.

Figure 5:
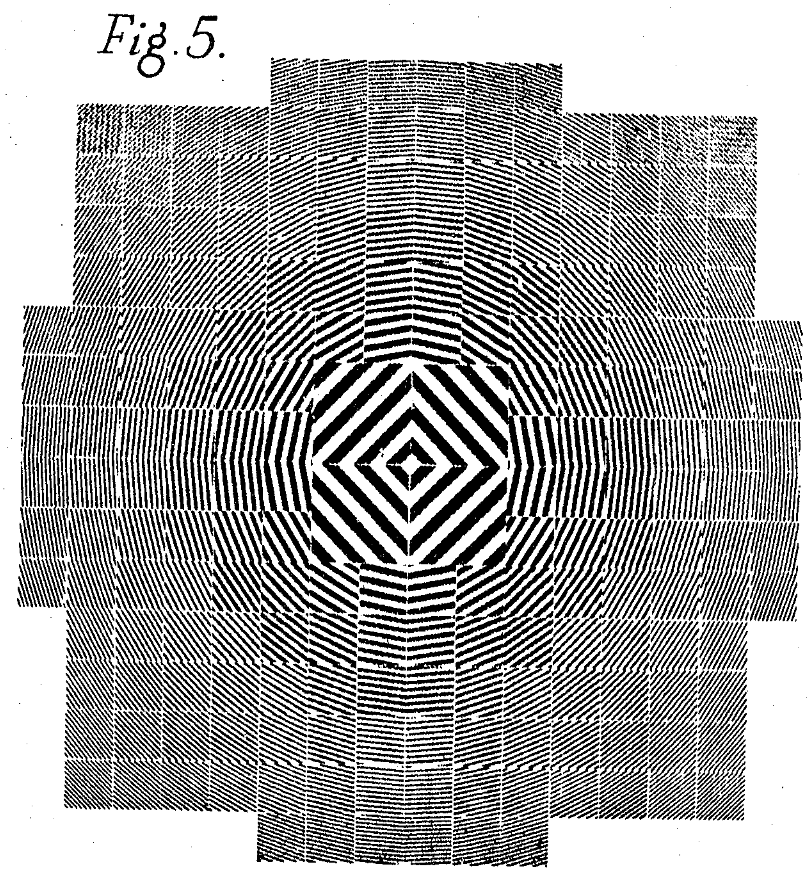
FIG. 5 illustrates another, more general, form of grating giving a much larger number of Fourier coefficients.

Another Another useful variation of grating is the well-known zone plate, any small area of which can be regarded as a linear grating system whose spatial frequency is proportional to its distance from the center and whose orientation is perpendicular to the radius. In yet another alternative, a composite array of discrete grating regions can be built up as shown in FIG. 5.

With such composite gratings the various sensing devices can be located in a single plane behind the grating at positions chosen in accordance with the two-dimensional Fourier transforms of the intensity distributions of the characters of the series capable of being recognized. It has been found that the numerals 0, 1, 2....9 of the Gill Sans Titling type font can be distinguished from one another using only three Fourier coefficients measured at seven levels of amplitude (three binary bits) and with only one of these phase sampled. This type font is one in which the numerals 6 and 9 are true inverses of one another and are distinguished only by the phase channel signal.

It will be understood that other font types for both numerals and letters may require more and different Fourier coefficients to be measured depending upon the type characteristics. In general, the methods and arrangements according to the invention require a minimum collection of primary information, i.e. have a relatively low redundancy value, and are relatively insensitive to variations of type face. This arises largely from the fact that fine details, such as serifs, appear in the higher frequency terms of the transform and can be eliminated without substantial loss of resolving power by an arbitrary cut at the high frequency end of the spatial frequency range.

Figure 6:
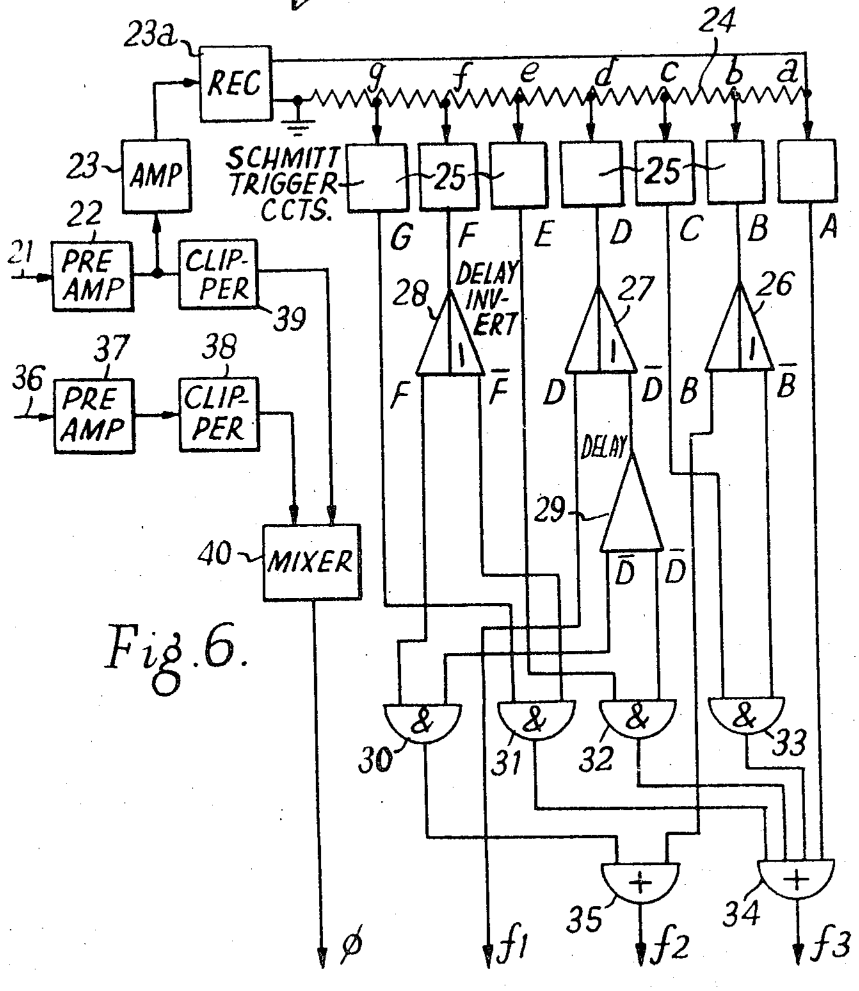
FIG. 6 is a mainly block schematic circuit diagram illustrating the electric signal handling arrangements associated with one of the sensing devices.

Reference is now made to FIG. 6 which illustrates, mainly in block schematic form, the electronic circuit means for deriving a binary digital signal representing the amplitude of the contrast signal from any one of the sensing devices, for example, the detector 15 and also for deriving the phase reference signal. The amplitude signal from, say, the detector 15 (FIG. 1) is applied over input 21 to a preamplifier 22 whose output, after further amplification in amplifier 23, is rectified in rectifier circuit 23*a* and applied across a potential divider 24 having seven suitably spaced tappings *a*, *b*, *c*....*g*. Each of such tappings is connected to a voltage sensitive two-state trigger device 25, e.g. a Schmitt trigger circuit, arranged to be set on whenever the contrast signal amplitude at its input terminals exceeds a chosen value and to be reset off whenever the input falls below such level.

The respective outputs from the devices 25 are applied to a logical circuit network of inverter/delay devices 26, 27, 28, delay device 29, AND gates 30, 31, 32 33 and OR or buffer gates 34, 35 to provide three binary digital outputs $f1(2^2)$, $f2(2^{1a)\ and}\ f3(2^0)$ which collectively signal the amplitude level in seven equal steps in conventional manner.

The phase signal $\Phi$ is obtained by applying the output from the additional detector 18 (FIG. 1) to the input 36 of a second preamplifier 37. The output from this amplifier is converted to rectangular waveform by a clipping circuit 38. The output from the contrast preamplifier 22 is similarly treated in clipping circuit 39 in order to render the phase signal independent of amplitude variations. The respective clipped outputs are then fed to a homodyne wave mixer circuit 40 which operates to provide a binary form output whose value 0 indicates an out-of-phase relationship between the contrast and reference signals and whose value 1 indicates an in-phase relationship between such signals.

Figure 8:
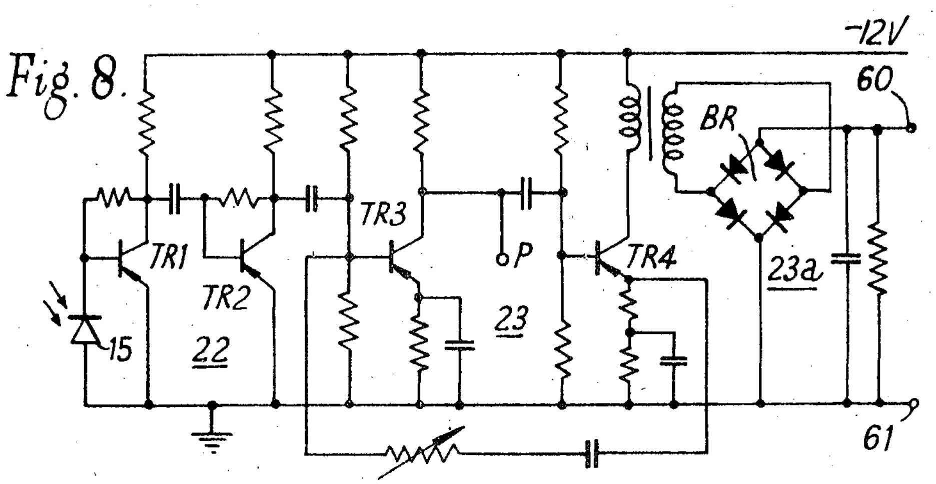
FIGS. 8 and 9 are detailed circuit diagrams of one form of certain of the circuit components shown in FIG. 6.
Figure 9:
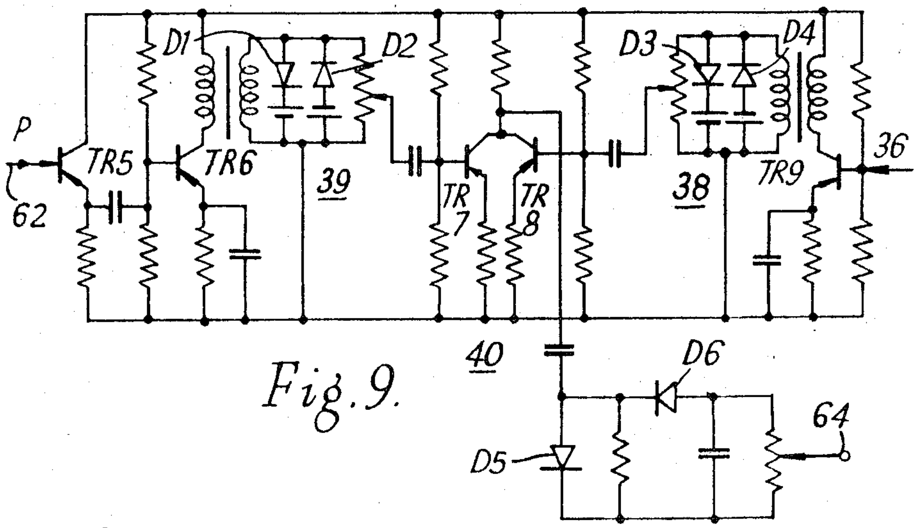

FIG. 8 shows one practical form of the preamplifier 22, amplifier 23 and rectifier 23*a*, the transistors TR1 and TR2 with their associated components forming the preamplifier 22, the transistors TR3 and TR4 with their associated components constituting the main amplifier 23 and the bridge rectifier network BR providing the rectifier 23*a* whose output from terminals 60, 61 is applied across the potentiometer network 24, FIG. 6. The output P from the collector of transistor TR3 is connected to the input 62 of the phase signal arrangements of FIG. 9 in which transistors TR5, TR6 form emitter follower and output stages respectively supplying the clipper circuit 39 including oppositely poled and biased rectifiers D1, D2. The output from the latter forms one input for a homodyne mixer circuit 40 of transistors TR7 and TR8. The reference input 36 from photodetector 18, FIG. 1, is fed to the opposite side of the circuit 40 through transistor TR9 and a second clipper circuit 38 including reversely polarized and biased diodes D3, D4. The mixer output, after rectification by diodes D5, D6 provides the required phase indicating DC analogue voltage signal at terminal 64.

Figure 7:
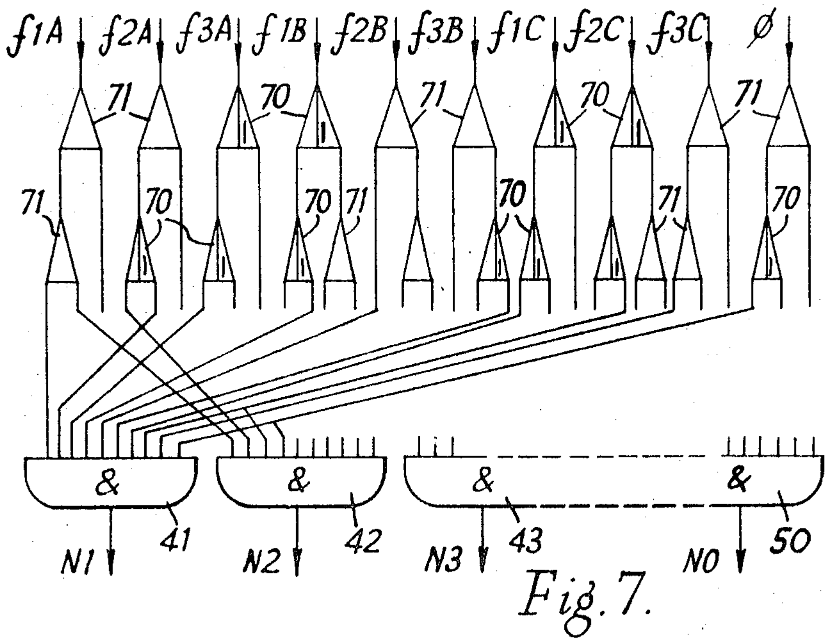
FIG. 7 is a block schematic diagram illustrating one form of logical circuit network for deriving a number identification outputs from three sensing devices and means for generating a phase reference signal relative to one of said sensing device outputs as described with reference to FIGS. 1—6.

FIG. 7 indicates, in block schematic form, the manner in which three 3-bit binary contrast signals $f1_A...f3_A$, $f1_B...f3_B$, $f1_C...a3_C$, each derived by circuit means as shown in FIG. 6 from suitably different spatial frequency component examinations of a character and a single phase signal may be used to identify the examined character from within a range of the decimal numbers 1, 2...9,0. The 10 input signals are each fed, in either direct or inverse form through suitable logical circuit elements of inverter/delay devices 70 and delay devices 71 as shown, to separate 10 input AND gates 41, 42, 43...50 whose outputs, when active, provide identification signals N2, N2, N3...N0. The particular signal combinations for each identification signal are, of course, different and in accordance with the particular spatial frequency and phase signal characteristics of the number concerned.

In many instances it is not necessary to connect each available input, or its inverse, to each of the output gates 41...50. Instead, it may be sufficient to make only those connections to a particular character output AND gate from those detectors which serve to distinguish such character from all of the other characters. Thus, if, in FIG. 7, the character N1 is distinguished from all other by detectors A and C, then the connections $f1A$, $f2A$, $f3A$, $f1C$, $f2C$ and $f3C$ from only these detectors need be made to gate 41. The phase detector signal $\Phi$ is needed only to distinguish the numerical characters "6" and "9" which are similar apart from inversion. Such phase detector connection $\Phi$ therefore need be made only to gates 46 and 49 associated with respectively outputs N6 and N9.

Figure 14:
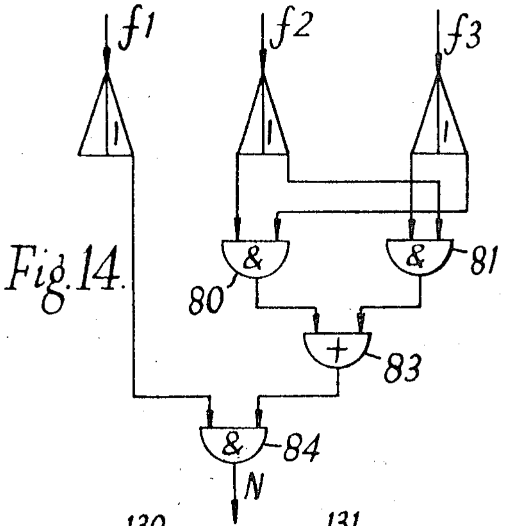
FIGS. 14 and 15 are fragmentary block schematic diagrams illustrating modifications of the logical circuitry as shown, for example, in FIGS. 6 and 7.

It has been found that certain detectors when analyzing certain characters produce signals which are unstable in that they oscillate between two levels. In these circumstances (assuming that sufficient detector points are used to ensure that instability will not produce identical signals for two different characters) it is necessary to ensure that both of the unstable levels will operate the correct output AND gate. Thus, referring to FIG. 14 of the accompanying drawings, if a particular detector registers an output level which oscillates between 1(0.0.1) and 2(0.1.0) then an arrangement incorporating AND gates 80, 81 feeding an OR gate 83 can be employed to ensure that the output AND gate 84 will be appropriately energized with either level.

The same technique may be employed to take account of variation of type face. Some degree of redundancy must, of course, be present.

Figures 15, 17:
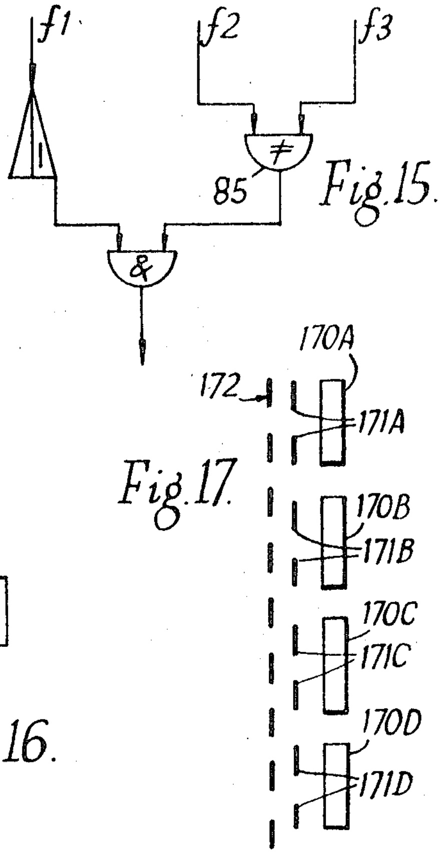
FIG. 17 is a diagrammatic view illustrating an alternative arrangement for simulating scanning without relative motion between different parts of the system.

In an alternative arrangement for a similar purpose a "not equal" circuit may be used as shown at 85 in FIG. 15 of the accompanying drawings. Such schemes may clearly be extended to cover all possible two-level oscillations which may occur. Instability may, in some circumstances, be further reduced by individual adjustment of the switching levels of the devices 25 of FIG. 6. In another modification the number of amplitude levels available from each detector output is reduced to two, i.e. binary on or off, by an increase in the number of Fourier coefficients studied.

Numerous modifications may be made to the simple arrangement so far described in order to explain the principle involved. It has been found that the signal developed by each sensing device can be improved by the provision immediately in front thereof a grid or grating whose form and orientation is similar to that of the shadowing grating 14. Such additional grids are indicated at 75 in FIG. 1 for the detectors 15, 15*x*, 15*y*, and 18. In view of the need to maintain similarity of orientation of such additional grids with the shadowing grating, their use is clearly more convenient when a composite, nonrotatable, shadowing grating as shown in FIG. 4 or FIG. 5 is used. The detector grids are then in accordance with the form and orientation of the region of the shadowing grating with which the associated detector is cooperating. The improvement afforded by such additional grids is most marked when the sensitive receptive areas of the associated detectors are relatively large and not of the "point source" type.

Figure 10:
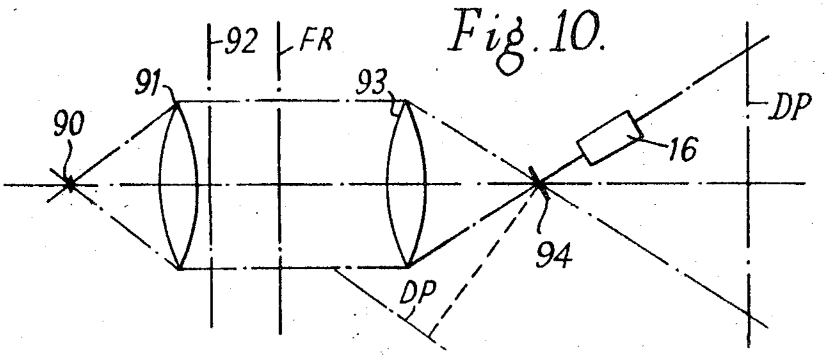
FIG. 10 is a diagrammatic view illustrating a modified optical system.

FIG. 10 illustrates a modified optical system in which the object or character 90 is located at the focal point of a lens system 91 and the emerging beam passes through the grating or zone plate at 92, located close to the lens system 91, and sets up spatial frequencies of the Fourier transform in plane FR. This plane FR is then magnified up by a further lens system 93 before detection in the plane DP.

With this system a small rotating mirror 94 similar to the mirror 13 of FIG. 1 may be employed if placed at the focal point of the lens system 93. Field is not lost since the shadow plane is set up before rotation is effected. The whole of the optical components can be of small size, the limiting factor being the diffraction at the highest frequency gratings. The physical size of the detectors employed in the plane DP is no longer critical since the image of the transform plane is magnified by the lens system 93 to any convenient extent without loss of light.

An additional aid to recognition is the so-called "zero-frequency coefficient." Such zero-frequency coefficient, which corresponds to the origin of the transform plane, is proportional to the area of the character and may be determined by means of a photodetector or equivalent sensing means viewing the character directly. Such sensing means may be positioned as shown at 95 in FIG. 1 between the character and the light collimator or, alternatively, in contact with a clear region of the grating 14 so that no relative motion occurs between the shadow and the detector. When a phase reference beam is employed such reference beam must be prevented from causing generation of a signal in the zero order detector, for example, by the use of suitable polarization arrangements or color filtering.

Measurement of the phase of any Fourier coefficient may be made in a number of ways other than that already described above. For example in one alternative arrangement, the beam from the character and the phase reference beam are kept distinguishable from one another, as before, by polarization or color filtering but the phase reference beam is caused to be effective upon two separate sensing devices, e.g. photodetectors, so positioned behind the appropriate shadowing grating that the respective output signals from such sensing means are in quadrature. Thus, in one particular arrangement one detector is displaced sideways relative to the other by a distance equal to one quarter of the repeat distance of the shadow. The signals from such spaced detectors can then be regarded as the Cos and Sine reference signals. These signals may then be combined with the character signal in either of two ways.

On manner of combination involves the splitting and clipping of the character signal followed by the combination of one half signal with a clipped Cos reference signal and the other half signal with a clipped Sine reference signal. Combination may be effected in a phase sensitive or homodyne system to provide two voltages which change in a definite sequence representing respectively the Cosine and Sine of the phase angle of the Fourier coefficient. This system is independent of the amplitude of the Fourier coefficient provided such amplitude is not too low.

The second manner of combination avoids clipping of any of the signals Instead, the character signal is split into two halves which are then combined with the Cos and Sine reference signals respectively. In this system the voltages obtained are dependent upon both the amplitude and the phase of the Fourier coefficient, being simply related to the real and imaginary parts of such coefficient.

As an alternative to the rotary scanning motion already described a linear sweeping or scanning motion may be employed and, in the case of an arrangement as shown in FIG. 1, effected by mounting either the mirror 13 or the grating 14 or the various photodetectors 15, 18.... upon an electromagnetically driven tuning fork.

For high speed operation, for instance within the reading range 100 to 10,000 characters per second, mechanical systems, such as the rotating or vibrating mirror systems already described become impracticable and need to be replaced by electron-optical systems such as cathode-ray tubes or image converter tubes of conventional or special design.

Thus the input character representation in incoherent light directed on to the grating, e.g. the grating 14 in FIG. 1, may be provided by the visible image produced upon the screen of a normal cathode-ray tube driven in normal TV manner from an input camera system. Such a TV type link is also useful, even in slow speed mechanical systems, for effecting conversion of a black on white input character image into a white on black image.

Figure 11:
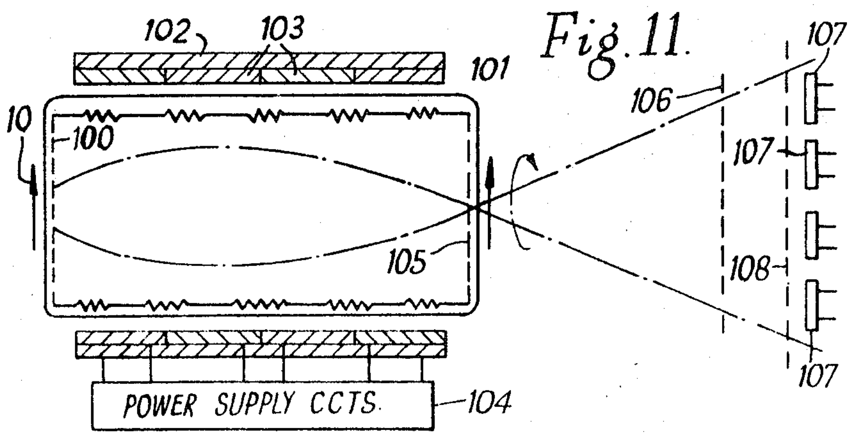
FIG. 11 illustrates an alternative arrangement employing an electron optical image tube for high speed rotation of the character.

FIG. 11 illustrates another high speed arrangement in which the input character 10 is focused upon the photosensitive screen 100 of an image converter tube 101 provided with the customary focusing field coils 102 and beam deflection coils 103 supplied from a suitable source 104 of focusing and deflection currents. The tube beam produces a replica of the input image upon its output fluorescent screen 105, such output image being rotatable in well-known manner by the supply of suitable deflection currents to the deflection coils 103. Such image is then directed in the manner already described on to a grating or zone plate 106 and therethrough to detector devices 107 located behind matching detector grids 108.

Figure 12:
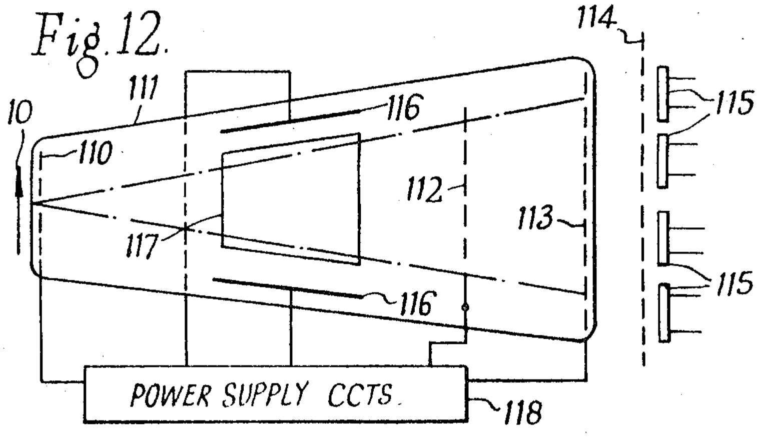
FIG. 12 illustrates another alternative high speed arrangement employing an electron optical image tube in conjunction with photo detector devices.

Another arrangement employing a special form of image tube is shown in FIG. 12.

In this form of device, the luminous character image 10 is produced on an electron emissive front screen 110 of the tube 111 to produce an electron beam within the tube conforming in section to the character shape. This beam is accelerated along the tube towards an internal zone plate 112 in the form of a suitable grid held at a potential such that no charge is built up thereon. Those electrons of the beam which pass the zone plate then produce a visual image upon the fluorescent screen 113 and light from this is received by suitably placed detector devices 115 via a masking grid 114 in the "shadow" plane. A rotating field is applied to the electrons travelling down the tube by means of conventional deflection plates 116, 117 supplied with AC voltages in quadrature from source 118 in order to generate the output signals. Such rotating field may operate at a frequency as high as 100 M/Sec., the limit being set by the frequency response to the collecting detector devices and the recovery time of the light sensitive screen.

Figure 13:
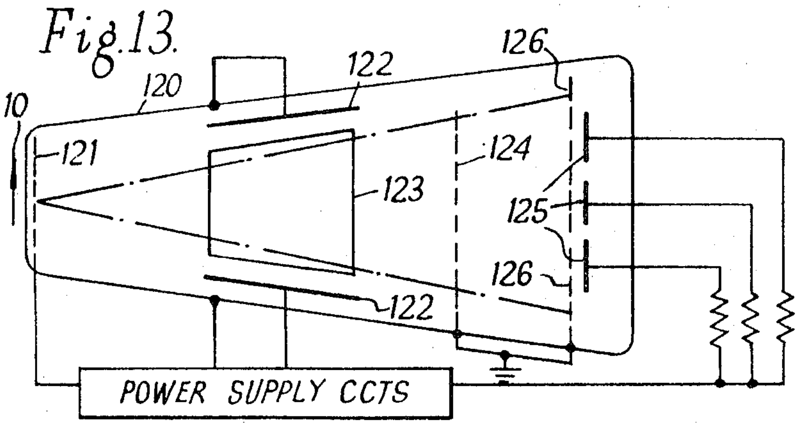
FIG. 13 illustrates another modification, similar to FIG. 12, but employing electron detectors.

Another arrangement, similar to FIG. 12, is shown in FIG. 13 in which the tube 120, provided with an input photosensitive screen 121 and deflector plates 122, 123 and a zone plate grid 124, has a plurality of electron collectors or anodes 125 located immediately behind masking grids 126 disposed within the tube envelope.

Such electron-optical device arrangement allows a very high reading speed, e.g. up to one million per second. Very small grids may be used if necessary and relatively low light levels are required. Either electrostatic or electromagnetic deflection methods may be used for rotation of the shadow.

Since with such electro-optical arrangements the segregation of the character and reference signal beams by polarization or color filtering is no longer possible, it is necessary either to ensure that the reference beam is kept completely clear of the character beam or a separate artificial reference beam system must be used.

Figure 16:
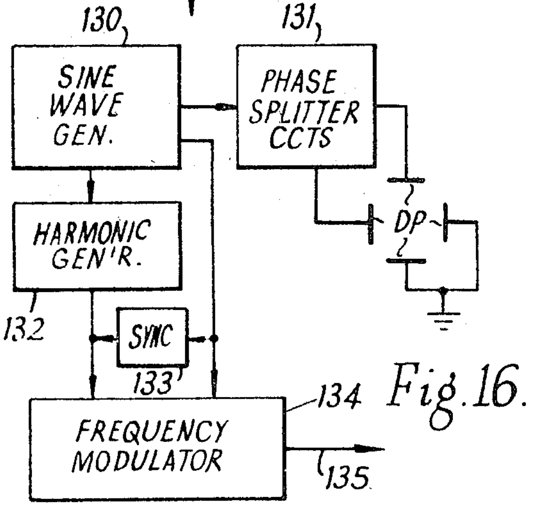

One arrangement for generating such an artificial reference signal is shown in FIG. 16 of the drawings. The basic frequency oscillation for rotating the character beam within the tube is provided by a sine wave generator 130 and, by means of a 90° phase splitter circuit 131 two signals in quadrature are generated for application to the image tube deflector means, shown as deflector plates DP A frequency which is a harmonic or overtone of the basic frequency of the oscillator 130 is provided by a further oscillation generator 132 and is synchronized to the basic frequency generator 130 by means 133. The phase reference waveform is provided by the output 135 of a frequency modulator 134 which operates to modulate the output from generator 132 at the basic frequency of the generator 130.

In a further alternative scheme all of the elements of the system are kept stationary and an equivalent of the previous mechanical scanning is obtained electronically Such "static scanning" may be achieved by allowing the shadow of the generating grid to fall on to a matching grid located just in front of the photodetectors. Referring to FIG 17 of the drawings which illustrate the arrangements for measuring one transform coefficient, four detectors 170A, 170B, 170C and 170D are employed instead of one, and the associated matching grid 171 is broken up into four parts as shown at 171A, 171B, 171C and 171D As will be seen section 171A of the matching grid MG matches the adjacent shadow generating grating 172 exactly, section 171B, although of the same spacing dimension as the shadow grating 172, is shifted by one-fourth of a space period sideways while matching grid sections 171C and 171D are similarly shifted by one-half and three-fourths of a period relative to grid section 171A.

As a result of the different relative displacements of the shadow generating grating 172 and the sections of the matching grid 171, the "beats" between the shadow and the four sections A, B, C, D of the grid 171 produce signals which are different.

If the shadow cast by a particular elementary grid on to the plane of the associated detector has the profile $$I=H+a\ \mathrm{Sin}\left(\frac{2\pi x}{d}+\phi\right)$$

where H is a steady background or average illumination, $a$ is the amplitude of the shadow modulation, $d$ is the period of the shadow and Φ a phase angle describing the distance, off-axis, at which the pattern peaks, then this can effectively be modulated by the mask or grid sections 171A,..171D whose respective transmissions are:

$$\text{Section 171A}\ \frac{1}{2}\left(1+\mathrm{Sin}\ \frac{2\pi x}{d}\right)$$

$$\text{Section 171B}\ \frac{1}{2}\left(1+\mathrm{Cos}\ \frac{2\pi x}{d}\right)$$

$$\text{Section 171C}\ \frac{1}{2}\left(1-\mathrm{Sin}\ \frac{2\pi x}{d}\right)$$

$$\text{Section 171D}\ \frac{1}{2}\left(1-\mathrm{Cos}\ \frac{2\pi x}{d}\right)$$

The average transmission may be determined by integrating over a complete cycle from 0 to $d$ and it can be shown that the transmission $$\text{P of grid section 171A}=\frac{Hd}{2}+\frac{ad}{4}\ \mathrm{Cos}\ \phi$$

$$\text{Q of grid section 171B}=\frac{Hd}{2}-\frac{ad}{4}\ \mathrm{Sin}\ \phi$$

$$\text{R of section 171C}=\frac{Hd}{2}-\frac{od}{4}\ \mathrm{Cos}\ \phi$$

$$\text{S of grid section 171D}=\frac{Hd}{2}+\frac{ad}{4}\ \mathrm{Sin}\ \phi$$

Hence $$P-R=\frac{ad}{2}\cos\phi$$

$$S-Q=\frac{ad}{2}\sin\phi$$

and $$a=\frac{2}{d}[(P-R)^2+(Q-S)^2]^{1/2}$$

$$\tan\phi=\frac{S-Q}{P-R}$$

By appropriate processing of the signals from the detectors 170A...170D, output signals representing the amplitude and phase of the shadow ripple may be derived in a manner similar to the dynamic scanning systems already described. Processing is assisted by modulating the input character light at a suitable angular frequency *w*. It is then practicable to construct the difference P–R and S–Q with the aid of differential amplifiers or bridge circuits and to convert Φ from a spatial phase angle into a temporal phase angle by a phase shift network. The amplitude *a* may be converted to a DC analogue voltage by means of a transformer and bridge rectifier.

Various changes and modifications may be made without departing from the scope of the invention. For example, a mirror may be placed behind the grating (such as that of 14 in FIG. 1) and the various detectors then located on the same side of such grating as the incident representation. As an alternative to altering the switching levels of the trigger devices 25, FIG. 6, in order to deal with instability, the positions of some or all of the tappings *a*, *b*...*g* on the potential divider 24 may be altered.

We claim:

1. A method of effecting recognition of a pattern which comprises the steps of:

causing a representation of the pattern in incoherent light, moving electrons or other charged particles to cast shadows of at least one grating of straight opaque lines and transparent interline spaces on to a plurality of appropriately positioned photoelectric or equivalent sensing devices thereby to derive a plurality of electric signals representing respective different Fourier coefficients of one or more spatial frequency components of the pattern, causing said plurality to include a signal representing the phase of at least one of said Fourier coefficients, and then subjecting said plurality of signals to a comparative examination by means of a logical circuit network to derive an output signal indicating the identity of the represented pattern.

2. The method according to claim 1 in which a signal representing the zero frequency Fourier coefficient component is derived and applied to said logical network during said comparative examination.

3. The method according to claim 1, in which said pattern representation is caused to cast shadows of each of a plurality of gratings on to separate sensing devices.

4. The method according to claim 4 in which said plurality of gratings have different line and interline spacing dimensions.

5. The method according to claim 3 in which the respective line and spacing directions of said plurality of gratings are oriented at different angles.

6. The method according to claim 1 in which relative scanning movement is caused to occur between said pattern representation and said grating or gratings and/or said sensing devices.

7. The method according to claim 1 in which the effect of relative scanning movement between said pattern representation and said sensing devices is simulated by the use of additional masking grid means similar to said grating in front of said sensing devices, said masking grid means for each Fourier coefficient being subdivided into a plurality of sections having respectively different displacements relative to said grating and each controlling the pattern representation incident upon a separate sensing device, the different outputs from the sensing devices for each coefficient being processed substantially as described.

8. The method according to claim 1 in which the pattern is a written or printed character forming one of a defined finite set of characters.

9. The method according to claim 8 in which said pattern representation consists of the character illuminated by incoherent light.

10. The method according to claim 9 in which said pattern representation is derived by illumination of the character printed on a rough surface, such that, even if illuminated coherently, the light reflected from such surface has such random phase relationships as to have no systematic spatial coherence.

11. A method according to claim 9 in which said pattern representation is derived from illumination of a transparency thereof with incoherent light.

12. The method according to claim 11 in which said pattern representation is applied to light diffusing means.

13. The method according to claim 9 in which said pattern representation is derived from the visual light output from the fluorescent screen of a cathode-ray tube, image converter tube or the like.

14. The method according to claim 8 in which said pattern representation as applied at least to said grating consists of a stream of electrons.

15. The method according to claim 14 in which said stream of electrons are derived from excitation of a photoemissive surface in response to a light pattern.

16. Apparatus for effecting recognition of a pattern, e.g. a character, which comprises:

means for forming a representation of said pattern in incoherent light, moving electrons on other charged particles, a grating of straight opaque lines and transparent interline spaces, means for directing said pattern representation on to one side of said grating, a plurality of photoelectric or equivalent sensing devices located relative to said grating to receive light, electrons or other charged particles from said representation passing through said interline spaces of said grating, said positions being so chosen that the signal outputs from said sensing devices represent respectively different Fourier coefficients of one or more spatial frequency components of the pattern, means for deriving a signal output representing the phase of at least one of said Fourier coefficients, and a logical circuit network connected to be supplied with said outputs from said sensing devices and said output from said means for deriving a phase representative signal and adapted by comparative examination of said outputs to provide an output signal indicating the identity of said represented pattern.

17. Apparatus according to claim 16 which includes means for deriving a signal representing the zero frequency Fourier coefficient components, said further zero frequency component signal being arranged also to be applied to said logical circuit network for use in said comparative examination.

18. Apparatus according to claim 16 in which said grating comprises a plurality of grating sections of different form each associated with at least one of said sensing devices.

19. Apparatus according to claim 18 in which said grating sections have different line and interline spacing dimensions.

20. Apparatus according to claim 18 in which the respective line and spacing directions of said different grating sections are oriented at different angles.

21. Apparatus according to claim 16 in which said representation forming means comprise a source of incoherent light arranged to illuminate a rough surface bearing a light reflecting image of said pattern thereon.

22. Apparatus according to claim 16 in which said representation forming means comprise a transparency of said pattern and a source of incoherent light directed to pass light therethrough.

23. Apparatus according to claim 22 which includes a light diffusing means arranged to be illuminated by the light emerging from said transparency.

24. Apparatus according to claim 16 in which said representation forming means comprise a fluorescent screen forming part of an electron-optical device such as a cathode-ray tube, image converter tube or the like.

25. Apparatus according to claim 16 in which said representation forming means comprise an electron-optical device for providing a stream of electrons issuing from an area shaped in accordance with said pattern.

26. Apparatus according to claim 16 which includes means for causing relative scanning movement between said pattern representation and said grating and/or said sensing devices.

27. Apparatus according to claim 26 in which said scanning means include a mechanical device, such as a motor, arranged to cause movement of a light reflecting surface such as a mirror or prism.

28. Apparatus according to claim 24 which includes electron beam deflecting means operable upon the electron beam of said cathode-ray tube or other electron optical device for causing relative scanning movement between said pattern representation and said grating and/or sensing means.

29. Apparatus according to claim 25 in which said electron optical device includes an internal grid structure arranged tc operate as said grating.

30. Apparatus according to claim 16 in which a masking grid having a line spacing and orientation similar to that of said grating or associated grating section is disposed in front of said sensing device or devices.

31. Apparatus according to claim 30 in which, for each coefficient said masking grid is subdivided into a plurality of sections each displaced laterally by different amounts relative to the related shadowing grating and each controlling the pattern representation incident upon a separate sensing device, the respective outputs from said sensing devices being arranged for processing substantially as described to simulate the effect of relative scanning movement between said pattern representation and said sensing devices.

UNITED STATES PATENT OFFICE
CERTIFICATE OF CORRECTION

Patent No. 3,599,147 Dated August 10, 1971

Inventor(s) Gordon Leonard Rogers et al

It is certified that error appears in the above-identified patent and that said Letters Patent are hereby corrected as shown below:

IN THE CLAIMS

Claim 4, line 1, change "4" to --3--.

Signed and sealed this 18th day of January 1972.

(SEAL)
Attest:

EDWARD M.FLETCHER,JR.
Attesting Officer

ROBERT GOTTSCHALK
Acting Commissioner of Patents